United States Patent
Compter et al.

(10) Patent No.: US 8,902,031 B2
(45) Date of Patent: Dec. 2, 2014

(54) GUIDE HAVING PASSIVE GRAVITY COMPENSATION AND A VERTICALLY MOVABLY MOUNTED PLATFORM

(75) Inventors: John Compter, AC Rockanje (NL); Bart Van Campen, JE Eindhoven (NL); Arjan Bakker, PX Helenaveen (NL)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 13/642,830

(22) PCT Filed: Mar. 30, 2011

(86) PCT No.: PCT/EP2011/054937
§ 371 (c)(1),
(2), (4) Date: Dec. 4, 2012

(87) PCT Pub. No.: WO2011/131462
PCT Pub. Date: Oct. 27, 2011

(65) Prior Publication Data
US 2013/0076467 A1 Mar. 28, 2013

(30) Foreign Application Priority Data
May 20, 2010 (DE) .......................... 10 2010 027 954

(51) Int. Cl.
*H01F 7/02* (2006.01)
*H01F 7/20* (2006.01)
*H02N 15/00* (2006.01)
*F16C 32/04* (2006.01)

(52) U.S. Cl.
CPC ............. *H01F 7/0236* (2013.01); *H02N 15/00* (2013.01); *F16C 32/0434* (2013.01)
USPC .......................................... 335/306; 335/285

(58) Field of Classification Search
CPC ........ H02K 7/09; H01F 7/0236; H02N 15/00; F16C 32/0408; F16C 39/063; F16C 32/0434
USPC .......... 335/284–306; 310/90.5; 248/637, 638; 269/8
See application file for complete search history.

(56) References Cited

U.S. PATENT DOCUMENTS 2,305,416 A * 12/1942 Hansen, Jr. .................. 310/90.5
4,585,282 A * 4/1986 Bosley .......................... 310/90.5
(Continued)

FOREIGN PATENT DOCUMENTS

GB 539 409 9/1941
JP 59-113316 6/1984
(Continued)

OTHER PUBLICATIONS

International Search Report, issued in corresponding International Application No. PCT/EP2011/054937.
(Continued)

*Primary Examiner* — Bernard Rojas
(74) *Attorney, Agent, or Firm* — Kenyon & Kenyon LLP (57) ABSTRACT

A guide having passive gravity compensation via a magnet assembly for guiding a first body relative to a second body in a vertical direction has a spring guide which allows movements between a first and second body in the vertical direction and blocks the same in all other directions. The first body is connected to a first magnet and the second body to a second magnet. The second magnet has an opening within which the first magnet is configured, at least in part, so that a repulsion force, which counteracts the gravity of the first body, acts between the first and the second magnet that are each magnetized parallel to the vertical direction, but oppositely, the positive mechanical stiffness of the spring guide being at least partially compensated by a negative stiffness of the magnetic spring formed by the first and second magnets, and the first and second magnets being shaped such that a horizontal distance between the first and second magnet inside of the opening of the second magnet varies in the vertical direction. A platform supported by such guides is provided.

13 Claims, 6 Drawing Sheets

(56) References Cited

U.S. PATENT DOCUMENTS

| | | | |
|---|---|---|---|
| 5,043,615 A * | 8/1991 | Oshima | 310/90.5 |
| 5,831,362 A * | 11/1998 | Chu et al. | 310/90.5 |
| 6,413,138 B1 * | 7/2002 | Dokoupil | 446/129 |
| 6,836,042 B2 * | 12/2004 | Kuipers et al. | 310/90.5 |
| 6,838,967 B2 * | 1/2005 | Martin | 335/306 |
| 7,501,922 B2 | 3/2009 | Kazadi | |
| 8,296,913 B2 * | 10/2012 | Hull et al. | 29/227 |
| 2011/0057755 A1 | 3/2011 | Dams | |

FOREIGN PATENT DOCUMENTS

| | | |
|---|---|---|
| WO | 2007/101271 | 9/2007 |
| WO | 2009/093907 | 7/2009 |

OTHER PUBLICATIONS

International Preliminary Report on Patentability and Written Opinion, issued in corresponding International Application No. PCT/EP2011/054937.

* cited by examiner

GUIDE HAVING PASSIVE GRAVITY COMPENSATION AND A VERTICALLY MOVABLY MOUNTED PLATFORM

FIELD OF THE INVENTION

The present invention relates to a guide having passive gravity compensation. Such guides are used, for example, for vertically movably mounting a worktable or a platform, the intention being to prevent movements in other directions. The present invention also relates to a platform that is movably mounted using such guides.

BACKGROUND INFORMATION

Many applications, such as machine manufacturing or semiconductor production, require that machine elements be held against the force of gravity while the exactly controlled vertical movement thereof nevertheless be allowed. A readily predictable performance of the gravity compensation and of the guidance is an important condition that must be met in order to achieve an accurate and rapid control of the machine element to the desired position.

The type of guide that can be used depends on the size of the required vertical positioning range. If this range is relatively small, then guides based on elastic deformation can be used. Such guides are generally referred to as spring guides. Specific examples are leaf springs or parallel spring guides.

Certain pneumatic systems for compensating for gravity are conventional, for example. However, such pneumatic systems exhibit inherent internal friction and hysteresis effects, which, moreover, can vary as a function of position and time. This makes it substantially more difficult to accurately control the position of the machine element.

Certain gravity-compensating systems based on preloaded springs are also conventional. In this case, however, the compensating spring force is dependent on the location, which, in turn, makes it difficult to accurately control the position.

A very advantageous approach for a gravity-compensated guide is the combination of a guide using leaf springs and a gravity compensation based on a passive magnetic mount.

Thus, PCT International Patent Application WO 2009/093907 describes a magnetic actuator where leaf springs having low stiffness in the axial direction and high stiffness in the radial direction form a straight guidance in the axial direction. A passive gravity compensation is achieved by an arrangement of magnets. The low positive stiffness of the leaf springs in the axial direction is compensated in the working point of the guide by a negative stiffness of the magnetic mount, so that the positional control only requires a slight compensation for gravity or for guide-induced influences.

SUMMARY

Example embodiments of the present invention improve such a guide having passive gravity compensation, and connect this guide to a platform that is to be vertically movably mounted. The central focus here is to keep all disturbing influences away from a positional control to the extent possible, whether it be from positionally dependent forces of the guide itself or magnetic interaction of the guide with the ambient environment.

Accordingly to example embodiments of the present invention, a guide for vertically guiding a first body relative to a second body, having passive gravity compensation via a magnet assembly, includes:

a spring guide, which allows movements between a first and second body in the vertical direction and blocks the same in all other directions;

moreover, the first body being connected to a first magnet and the second body to a second magnet;

the second magnet featuring an opening within which the first magnet is configured, at least in part, so that a repulsion force, which counteracts the gravity of the first body, acts between the first and the second magnet that are each magnetized parallel to the vertical direction, but oppositely;

the positive mechanical stiffness of the spring guide being at least partially compensated by a negative stiffness of the magnetic spring formed by the first and second magnets;

and the first and second magnets being shaped such that a horizontal distance between the first and second magnet inside of the opening of the second magnet varies in the vertical direction.

If this horizontal distance is properly configured, it is possible, for example, to achieve a region of virtually constant negative stiffness of the magnetic spring, that extends, in particular, over the entire working range of the guide. This makes possible a more accurate positioning control, since there is no need to compensate for a positional dependency of the mount.

Further features and aspects of example embodiments of the present invention are described in more detail below with reference to the Figures.

DETAILED DESCRIPTION

Figure 1:
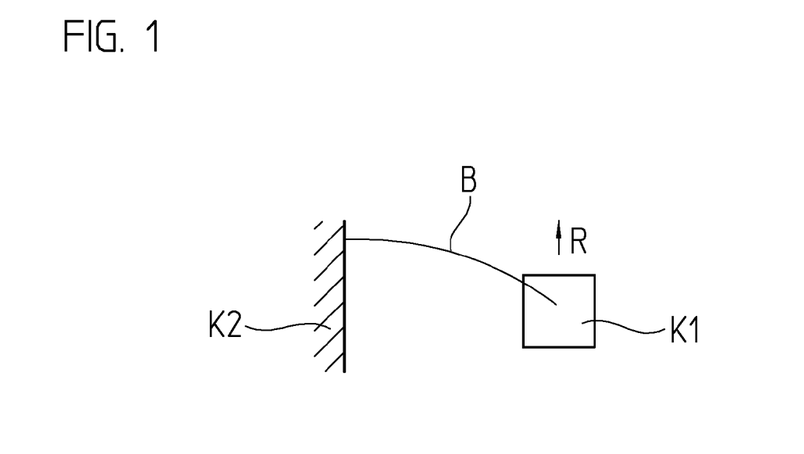
FIGS. 1-3 illustrate conventional systems.

FIG. 1 shows a first body K1 that is movably guided relative to a stationary second body K2 in a vertical direction R by a spring guide in the form of a leaf spring B. The selected representation greatly simplifies such a guide, but is helpful in explaining the principle used. Leaf spring B exhibits comparatively low stiffness in one preferred direction (here in vertical direction R), while it exhibits substantially higher stiffness (typically, by a factor of 100-1000) in other directions.

Therefore, as presented further below, such leaf springs make it possible to produce guides that permit a movement of a body in one direction, but block it in all other directions.

FIG. 1 shows that leaf spring B bends under the load of first body K1. As is readily discernible, this reduces the actually desired high stiffness of leaf springs B transversally to vertical direction R. Therefore, to the extent possible, leaf spring B should not be bent, but rather be flat in the working point of the guide.

Figure 2:
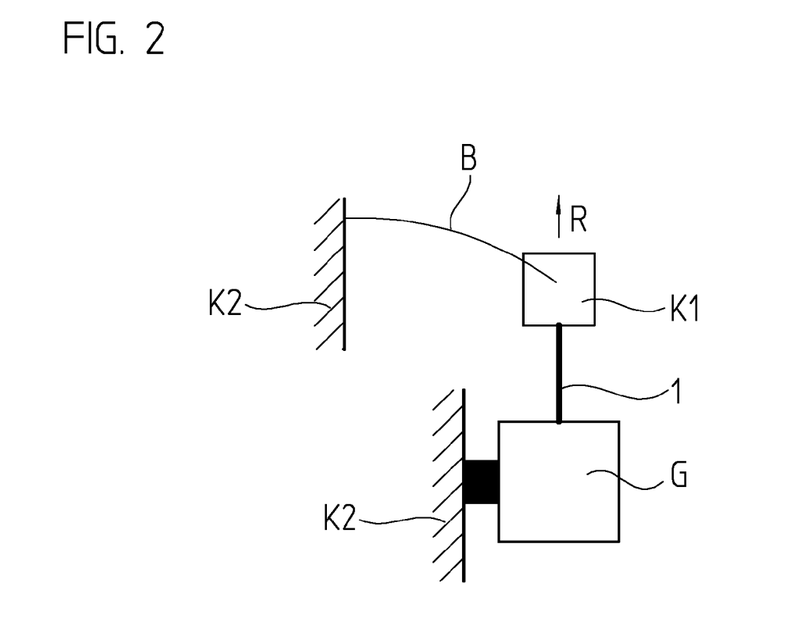

This is achieved by a device G for compensating for the gravity of first body K1, as is shown in FIG. 2. This device is stationary, in the same manner as second body K2, and exerts a force via shaft 1 against first body K1 that counteracts the gravity. In this position of leaf spring B, the guide exhibits an optimal stiffness transversally to guide direction R.

Figure 3A:
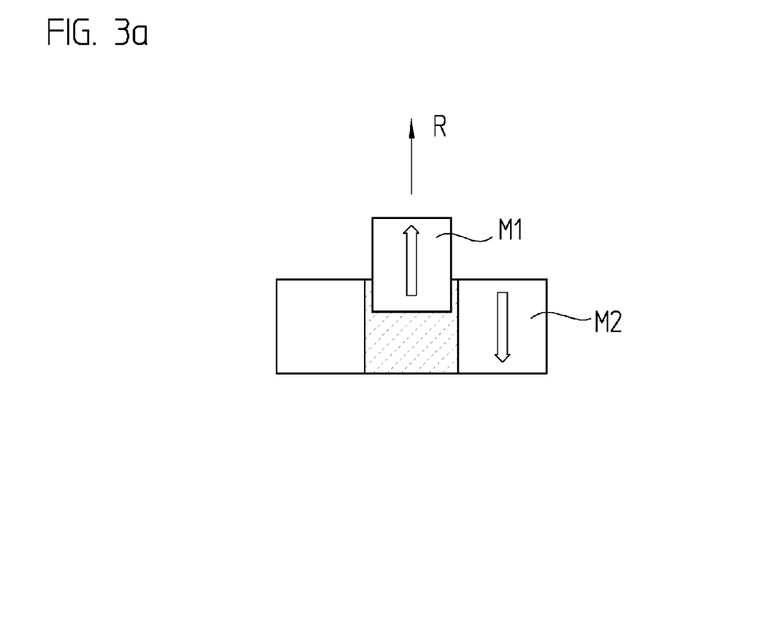

One option for achieving such a gravity compensation is shown in FIG. 3a. Via the shaft, a first magnet M1 is connected to first body K1; a second magnet M2 to second body K2, or vice versa. First magnet M1 is cylindrical. It is at least partially configured inside of a cylindrical opening of a second magnet M2 that has the form of a ring magnet. The two magnets M1, M2 are oppositely magnetized, resulting in a force counteracting the gravity of first body K1 in the illustrated configuration.

This magnet assembly forms a magnetic spring, which, given a proper configuration of magnets M1, M2, is preloaded by the gravity of the first body and thus bears the weight thereof.

Leaf spring B also exhibits a certain stiffness in the intended moving direction. A spring force is derived that is dependent on the vertical position of the first body and linearly dependent on the position in the working range of the guide. Thus, the stiffness of leaf spring B is constant in this range. This spring force must be counteracted when first body K1 is moved by a controlled drive.

It is, therefore, desirable that the magnetic spring provided for gravity compensation be designed to allow the spring constant, respectively stiffness thereof to counteract the stiffness of the spring guide and thereby cancel the same to the extent possible.

Figure 3B:
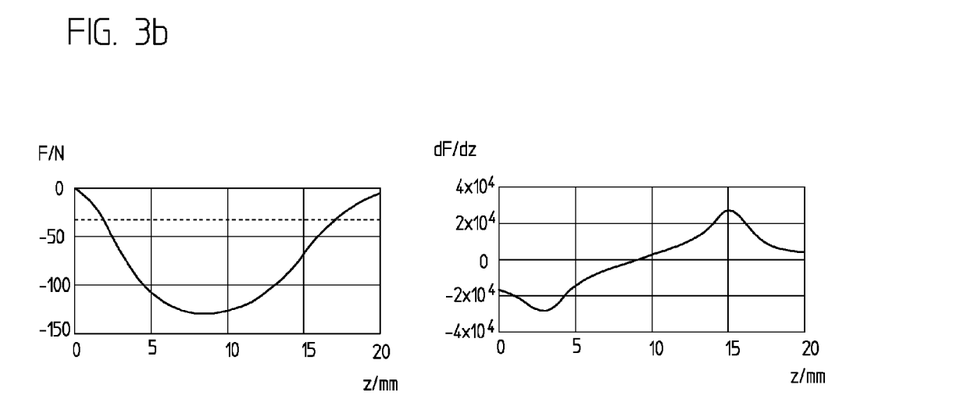

FIG. 3b, on the left, shows the force acting on first body K1 as a function of the vertical position of first magnet M1 and thus of first body K1. On the right, FIG. 3b illustrates the stiffness, respectively the local spring constant of the magnetic spring as a function of the vertical position of first magnet M1. To be able to counteract the stiffness of leaf spring B in the working range, a region having a most constant possible stiffness is needed, and thus a spring force that changes linearly in response to the position of the first magnet. Two such regions are discernible in FIG. 3b. However, they are only very small, and only one of them exhibits a negative stiffness for compensating for the positive stiffness of leaf spring B. Again, the stiffness of the magnetic spring changes over a working range of several millimeters, so that it is not possible to optimally compensate for the leaf spring stiffness. The drive control for exactly positioning first body K1 must thereby be parameterizable as a function of location and is, therefore, very complex and costly.

Therefore, one approach provides for adapting the form of first and/or second magnet M1, M2 in a manner that increases the usable range in response to a constant stiffness of the magnetic spring. Through extensive simulations and tests, it could be revealed that varying the horizontal distance between first and second magnet M1, M2 results in a significant increase in this usable range.

Figure 4A:
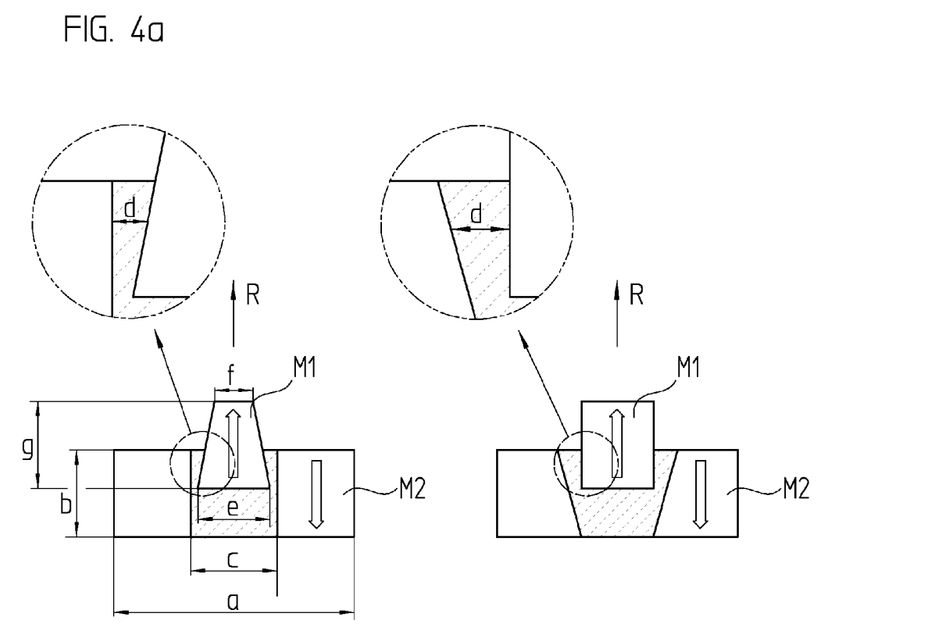
FIGS. 4-8 show a magnet assembly according to example embodiments of the present invention.
Figure 4B:
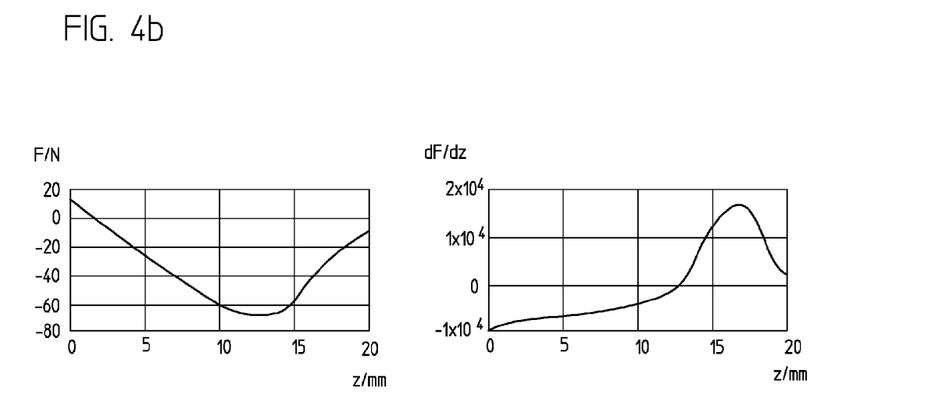

This measure is shown in FIG. 4a. The illustration on the left shows a conventional cylindrical first magnet M1 as a conical magnet. It has the effect of varying the lateral or horizontal distance between first magnet M1 and the cylindrical inner wall of the opening of second magnet M2 in the vertical direction. Specific numerical values are given for this exemplary embodiment: To compensate for a weight force of 33 N within a working range of four millimeters, magnets having the following dimensions are used:

First magnet M1: e=14 mm/f=5 mm/g=15 mm
Second magnet M2: a=28 mm/b=16 mm/c=16 mm Commercial NdFeB magnets having a magnetization of approximately 1.4 Tesla may be used.

The illustration on the right in FIG. 4a shows an alternative, equally valid option for varying the horizontal distance between the magnets. Here, first magnet M1 is cylindrical, while the opening of ring magnet M2 has a conical shape. Such a conical opening is simpler to manufacture than a conical magnet and may, therefore, be advantageous. Both the first, as well as the second magnet may have a conical shape—decisive is the varying distance between the two magnets M1, M2.

This is not absolutely required, even assuming that magnets M1, M2 are axially symmetric to a vertical axis, as previously described. The first magnet could also be in the form of a cuboid when the second magnet only has an opening matching the same. The two illustrations of FIG. 4a may then be understood as a section through such magnets M1, M2. The side walls of these first and/or second magnets are then configured to slant correspondingly in order to again achieve a varying horizontal distance. Other magnet shapes are also possible which may be used to produce a varying horizontal distance.

An important reason why axially symmetric magnets M1, M2 are nevertheless preferred, whose axis of symmetry extends through the shaft connecting first magnet M1 to the first body, resides in that, in accordance with Earnshaw's theorem, a positive stiffness in the radial direction is derived from the negative stiffness of the magnet assembly in the axial direction. This means that first magnet M1 self-centers in the opening of second magnet M2. In the case of an axially symmetric embodiment of the magnet assembly (the vertically oriented axis of symmetry lies in shaft 1), this centering action is equally strong in all horizontal directions. This is not the case when there is no axial symmetry. The varying horizontal distance between the two magnets M1, M2 thereby also effects a positional independence of this positive stiffness in the radial direction.

It is noted in this connection that the direction referred to here as vertical direction R may also be described as the axial direction or guide direction, and the horizontal direction thus as the radial direction that is normal to the guide direction.

The preferred application of the assemblies described here is compensating for the gravity of a body passively, on the basis of a magnet mount in conjunction with the guidance of this body in a guide direction using a spring guide, the stiffnesses of the spring guide and of the magnetic mount being at least partially compensated for. To this end, however, it is not absolutely required that the guide be "vertically" oriented in the sense of a gravitational force of the body directed toward the Earth's center. The guide may also be tilted by an angle ($\alpha$) relative to the direction of the gravitational force; it then only needs to compensate for a portion ($\cos \alpha$) of the weight. In the extreme case, the guide may even be oriented normally to the gravitational force, for example, when the gravitational force is correspondingly reversed. To the extent that reference is made herein to a vertical direction, it should generally be understood to be the direction of the degree of freedom of the linear guide. The horizontal direction is normal thereto.

In summary, it may be said that the assembly described here is optimally selected when, to compensate for the gravity in the entire working range, the sum of the forces of spring guide B and of device G exactly cancel the weight force of first body K1, and when, in addition, the negative stiffness of the magnet assembly composed of first and second magnet M1, M2 exactly cancels the positive stiffness of spring guide B in guide direction R. In this ideal case, no vibrations of second body K2 are transmitted to first body K1 (and vice versa) over the entire working range, and, to move the first body, a drive merely needs to overcome its inertia.

In practice, an exact positioning of the first body is disturbed or hindered by other influences. Thus, magnetic interactions with ferromagnetic objects located in the vicinity of the guide may exert forces on the first body via stray fields.

Therefore, the following discusses measures which prevent such influences and which also further improve the advantages described above.

Figure 5A:
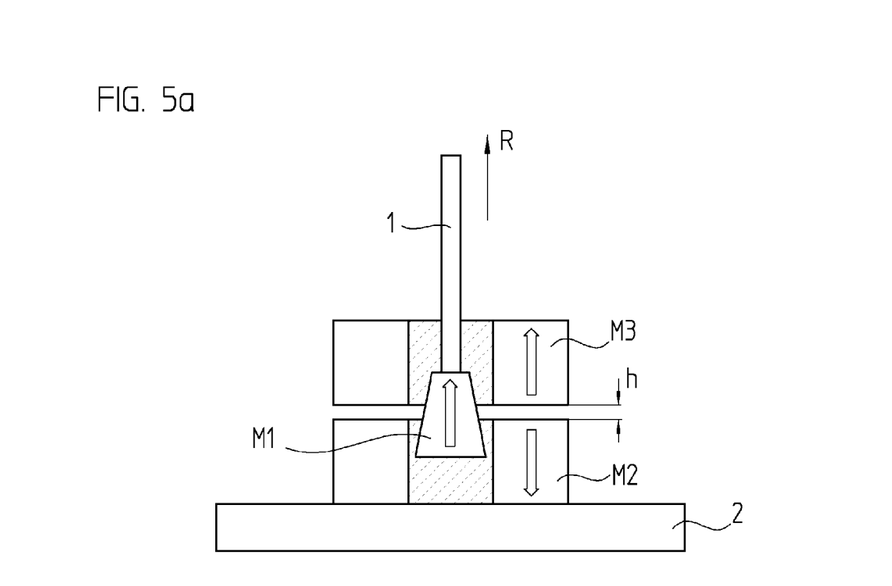

FIG. 5a shows a third magnet M3, which is formed as a ring magnet in the manner of second magnet M2 and is configured at a distance h above this second magnet. Third magnet M3 is magnetized oppositely to second magnet M2. Third magnet M3 also has an opening into which first magnet M1 extends partially at least in the top portion of the working range of the guide, and it also holds here that a horizontal distance between the first and second magnets M1, M3 inside of the opening of third magnet M3 varies in the vertical direction.

In the example given above for dimensioning magnets M1 and M2, a value of 4.5 mm is derived for an optimized distance h between the second and third magnet when third magnet M3 has the form of second magnet M2. A scaling of all dimensions by a factor would result in linear variations in the working range, as well as in a change in the force compensating for the gravity by the third power of the factor.

As an additional measure, second magnet M2 is configured on a ferromagnetic plate 2, for example made of iron, which substantially fulfills two functions. On the one hand, ferromagnetic plate 2 strengthens the flux density produced by second magnet M2, so that less magnetic material is needed to produce a given force. On the other hand, ferromagnetic plate 2 acts as a shield against interactions with ferromagnetic masses that are located in the vicinity and move underneath the magnet assembly. Such masses may interact namely with stray fields of magnets M1, M2, M3 and thus introduce an interfering force.

Figure 5B:
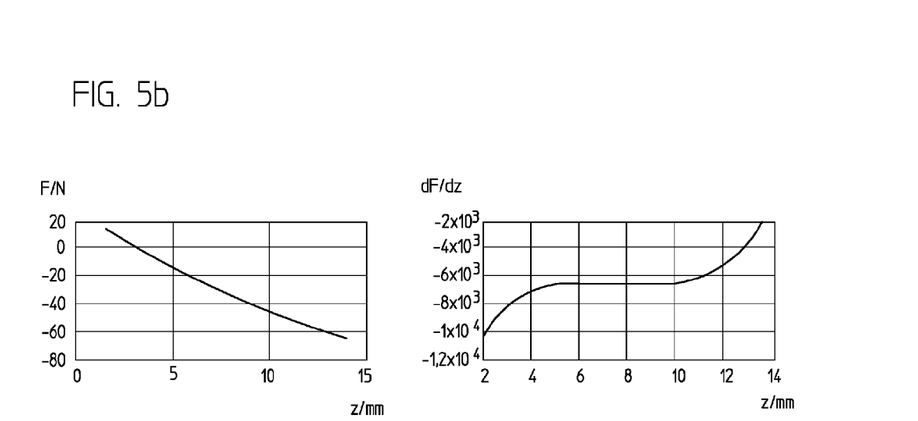

Again, as a function of location, FIG. 5b shows the force (left) and the spring constant (right) of the assembly in accordance with FIG. 5a. In comparison to the assembly according to FIG. 4a, it is discernible that a further improvement is attained in terms of the constancy of the spring constant, respectively the stiffness of the magnetic assembly, most notably due to additional third magnet M3. Within a range of between 5 mm and 10 mm, the stiffness is negative and hardly changes. Thus, within a targeted working range of approximately 4 mm, the positive stiffness of a spring guide may be very readily compensated.

Figure 6:
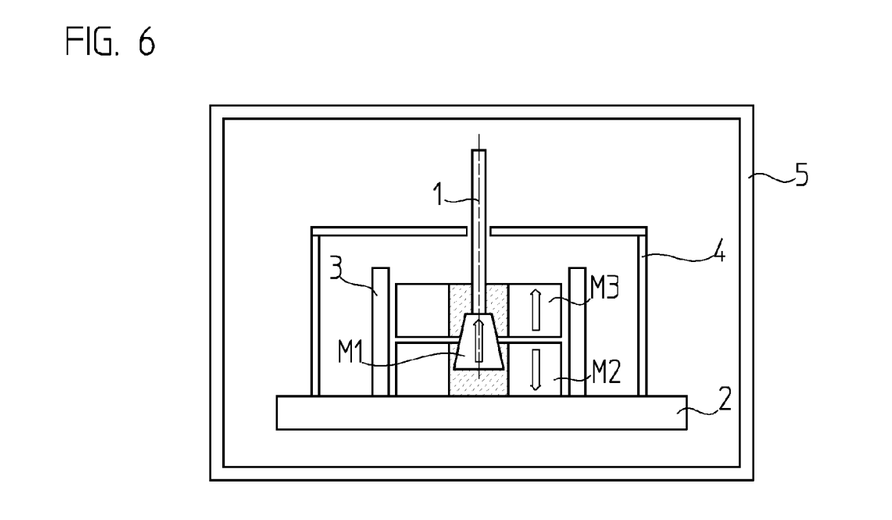

FIG. 6 shows further measures for magnetically shielding the guide. They serve to further minimize interactions with magnetic or ferromagnetic components in the vicinity of the magnet assembly.

A ferromagnetic cylinder 3, which is in contact with ferromagnetic plate 2, surrounds the magnet assembly and shields the same against external influences.

A first shield 4 composed of a ferromagnetic material, such as steel or, better, of mu-metal, of a soft magnetic nickel iron alloy having an especially effective shielding effect is provided as a further shielding cladding. This first shield 4 is composed of a hollow cylinder which, on one side, is closed by ferromagnetic plate 2 and, on the other side, features a disk which merely has an opening for shaft 1. Such a shield may be necessary, for example, in applications utilizing electron beams since such electron beams may be deflected by stray fields of the magnet assembly.

An even better shielding of stray fields is achieved when first shield 4 is not in magnetic contact with ferromagnetic plate 2, but rather completely surrounds the same. First shield 4 would then be a hollow body having an opening for shaft 1. Ferromagnetic plate 2 and shield 4 could then be connected to a non-magnetic material.

For especially extreme requirements, when stray fields must be reduced to below $10^{-10}$ Tesla, a second shield 5 of a ferromagnetic material, such as steel or mu-metal, may be provided, which, unlike first shield 4 in FIG. 6, is in magnetic contact with the magnet assembly.

Each of the measures mentioned for shielding against stray fields, reduces them roughly by a factor of 30.

Shaft 1, which connects first magnet M1 to first body K1, is preferably manufactured of a non-magnetic material in order to avoid unwanted parasitic forces. A material having a high electrical resistance should be selected to also prevent eddy currents from forming in the shaft. In consideration of these criteria, stainless steel is a well suited material for shaft 1.

Figure 7:
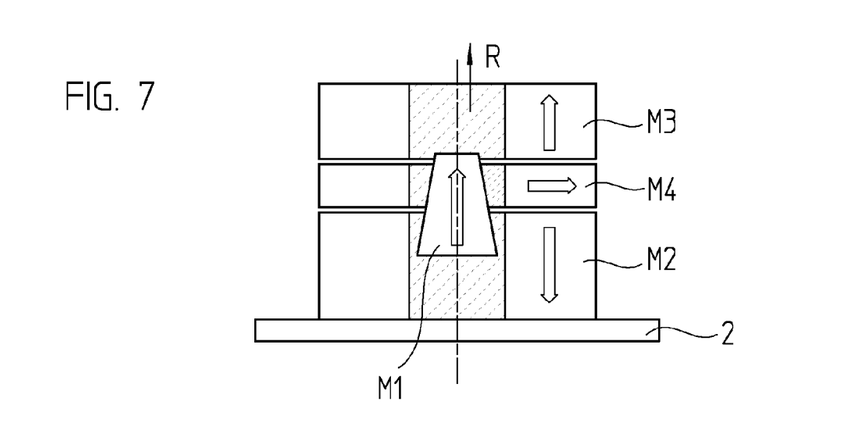
Figure 8:
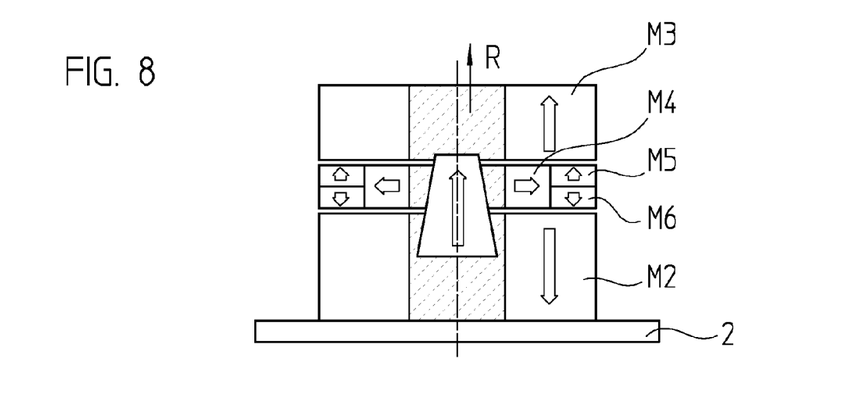

Further measures for optimizing the magnet assembly described up to this point are illustrated in FIGS. 7 and 8.

As a radially magnetized ring magnet, fourth magnet M4 shown in FIG. 7 fills the gap between second and third magnet M2, M3. Its primary purpose is to increase the load-carrying capacity of the magnet assembly. In FIG. 8, this fourth magnet M4 is designed to be radially somewhat narrower to leave space for one fifth and sixth magnet M5, M6 each, which are likewise formed with opposite axial magnetization, as are the ring magnets configured in the gap between second and third magnet M2, M3. These fifth and sixth magnets M5, M6 are used, most notably, for limiting the magnetic stray field occurring at the gap between the second and third magnet.

Figure 9:
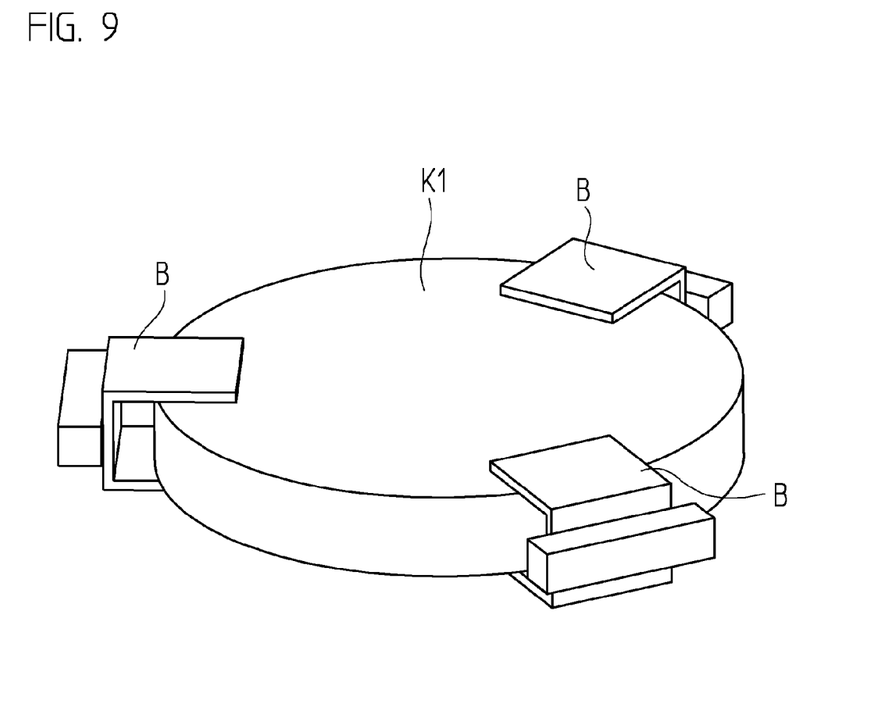
FIGS. 9-10 show a vertically movable platform having guides according to example embodiments of the present invention.
Figure 10:
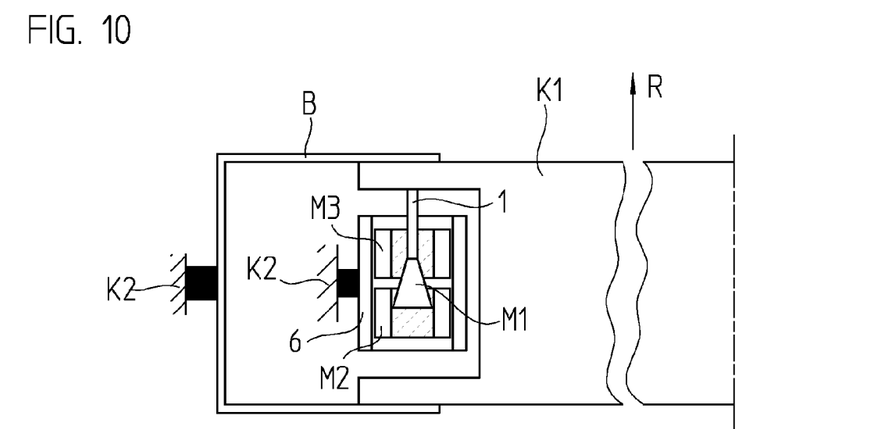

At this point, FIGS. 9 and 10 show a specific application of the vertical guide having gravity compensation. The guides described up to this point are advantageously connected to a platform which is to be movably supported and guided in the vertical direction.

As a first body K1, FIG. 9 shows a platform upon which a wafer may be set down for processing, for example. This platform is held by three gravity-compensated guides, which are uniformly distributed with 120 degree angular spacing at the rim of the round platform. Of the guides, only leaf springs B, two of which form a parallel spring guide, are discernible in FIG. 9.

Second body K2 is not shown. Leaf springs B hold the platform movably in a vertical direction, but block all other degrees of freedom.

In the case of second body K2, it may, in practice, be a question of a device for moving the platform horizontally, for instance, using two horizontally configured, crossed linear guides.

FIG. 10 shows a section through an individual guide of FIG. 9. It is discernible that leaf spring B having a clamp-type form is connected by closed rear side thereof to second body K2 and, extending out from this vertically oriented rear side, features two horizontal sides which are each connected to first body K1. Overall, therefore, first body K1 is held by six such sides.

The gravity compensation and the compensation of the positive stiffness of leaf springs B are achieved by a passive magnet assembly, which is placed between the two sides of leaf spring B and in a recess of the platform. Discernible is conical first magnet M1, which is connected via a shaft 2 to first body K1, thus to the platform. Moreover, a second and third magnet M2, M3 are held by a sleeve 6 fastened to second body K2, so that, essentially, a configuration in accordance with FIG. 5a results, in this case, however, without the ferromagnetic plate shown in FIG. 5a.

Thus, in this exemplary embodiment, each magnet assembly must compensate for one third of the weight of the platform.

In the exemplary embodiments shown, magnetization directions are indicated in part by arrows. It is noted that the directions themselves are not decisive, rather the orientation of the magnetizations to one another. Thus, the magnetization directions within a magnet assembly may also be reversed when all directions are reversed in each instance.

To achieve horizontal distance d that varies in the vertical direction, each of the conical forms are shown with linear boundaries in cross-sectional view in all of the figures. A varying horizontal distance d may also be achieved using curved or stepped boundary surfaces. These forms must be optimized for the particular application case, preferably using a simulation program for modeling forces in magnet assemblies.

In the exemplary embodiments shown, third magnet M3 is identical in form to second magnet M2. This does not necessarily have to be the case. It could, for instance, deviate in the outer radius or height thereof from second magnet M2 if required by the circumstances, for instance, if the available installation space were limited. The above mentioned advantages of such a third magnet are nevertheless at least partially attainable.

The acting magnetic fields may be modified to allow an additional force to act on the first body by integrating suitable coils in the magnet assemblies. An option is thus provided for actively positioning first body K1. By variably controlling the individual guides in the exemplary embodiment of FIG. 9, not only is a vertical shifting of the platform possible, but also a tilting thereof, which may be beneficial for various applications.

What is claimed is:

1. A guide device having passive gravity compensation by a magnet assembly for guiding a first body relative to a second body in a vertical direction, comprising:
    a spring guide adapted to allow movement between the first body and the second body in the vertical direction and blocking movement between the first body and the second body in other directions;
    a first magnet connectable to the first body;
    a second magnet connectable to the second body; and
    a ferromagnetic cylinder;
    wherein the first magnet and the second magnet are magnetized parallel to the vertical direction and magnetized oppositely to each other;
    wherein the second magnet includes an opening and the first magnet is at least in part arranged in the opening so that a repulsion force, which counteracts gravity on the first body, acts between the first magnet and the second magnet;
    wherein a positive stiffness of the spring guide is at least partially compensated by a negative stiffness of a magnetic spring formed by the first magnet and the second magnet;
    wherein the first magnet and the second magnet are shaped such that a horizontal distance between the first magnet and the second magnet inside of the opening of the second magnet varies in the vertical direction;
    wherein the second magnet is provided on a ferromagnetic plate; and
    wherein the ferromagnetic cylinder surrounds the magnet assembly and is provided on the ferromagnetic plate.

2. The guide device according to claim 1, wherein the first magnet is conical, and the opening of the second magnet is cylindrical.

3. The guide device according to claim 1, wherein the first magnet is cylindrical, and the opening of the second magnet is conical.

4. The guide device according to claim 1, wherein the first magnet and/or the second magnet have curved and/or stepped boundary surfaces to vary the horizontal distance between the first and second magnet in the vertical direction.

5. The guide device according to claim 1, further comprising a third magnet arranged above the second magnet and magnetized oppositely to the second magnet, the second magnet and the third magnet spaced apart by a distance.

6. The guide device according to claim 5, wherein the first magnet and the third magnet are shaped such that a horizontal distance between the first magnet and the third magnet inside of an opening of the third magnet varies in the vertical direction (R).

7. The guide device according to claim 5, further comprising a fourth magnet magnetized normally to the magnetization of the second magnet and located between the second magnet and the third magnet.

8. The guide device according to claim 1, wherein the magnet assembly is axially symmetric.

9. The guide device according to claim 1, further comprising a first shield provided on the ferromagnetic plate and surrounding the magnet assembly, the first shield composed of a ferromagnetic material, steel, and/or mu-metal.

10. The guide device according to claim 1, further comprising a shield surrounding the magnet assembly, the shield being formed of a ferromagnetic material, steel, and/or mu-metal and being not in magnetic contact with the magnet assembly.

11. A guide device having passive gravity compensation by a magnet assembly for guiding a first body relative to a second body in a vertical direction, comprising:
    a spring guide adapted to allow movement between the first body and the second body in the vertical direction and blocking movement between the first body and the second body in other directions;
    a first magnet connected to the first body;
    a second magnet connected to the second body; and
    a ferromagnetic cylinder;
    wherein the first magnet and the second magnet are magnetized parallel to the vertical direction and magnetized oppositely to each other;
    wherein the second magnet includes an opening and the first magnet is at least in part arranged in the opening so that a repulsion force, which counteracts gravity on the first body, acts between the first magnet and the second magnet;
    wherein a positive stiffness of the spring guide is at least partially compensated by a negative stiffness of a magnetic spring formed by the first magnet and the second magnet;
    wherein the first magnet and the second magnet are shaped such that a horizontal distance between the first magnet and the second magnet inside of the opening of the second magnet varies in the vertical direction;
    wherein the second magnet is provided on a ferromagnetic plate; and
    wherein the ferromagnetic cylinder surrounds the magnet assembly and is provided on the ferromagnetic plate.

12. A system, comprising:
    a first body;
    a second body;
    a guide device adapted to provide passive gravity compensation by a magnet assembly to guide the first body relative to the second body in a vertical direction, the guide device including:
        a spring guide adapted to allow movement between the first body and the second body in the vertical direction and blocking movement between the first body and the second body in other directions;
        a first magnet connected to the first body;
        a second magnet connected to the second body; and a ferromagnetic cylinder;
wherein the first magnet and the second magnet are magnetized parallel to the vertical direction and magnetized oppositely to each other;
wherein the second magnet includes an opening and the first magnet is at least in part arranged in the opening so that a repulsion force, which counteracts gravity on the first body, acts between the first magnet and the second magnet;
wherein a positive stiffness of the spring guide is at least partially compensated by a negative stiffness of a magnetic spring formed by the first magnet and the second magnet;
wherein the first magnet and the second magnet are shaped such that a horizontal distance between the first magnet and the second magnet inside of the opening of the second magnet varies in the vertical direction;
wherein the second magnet is provided on a ferromagnetic plate; and
wherein the ferromagnetic cylinder surrounds the magnet assembly and is provided on the ferromagnetic plate.

13. A system, comprising:
a first device arranged as a movable platform;
at least three guide devices holding the first device, each a guide device adapted to provide passive gravity compensation by a magnet assembly to guide the first body relative to the second body in a vertical direction, each the guide device including:
a spring guide adapted to allow movement between the first body and the second body in the vertical direction and blocking movement between the first body and the second body in other directions;
a first magnet connected to the first body; and
a second magnet connected to the second body;
wherein the first magnet and the second magnet are magnetized parallel to the vertical direction and magnetized oppositely to each other;
wherein the second magnet includes an opening and the first magnet is at least in part arranged in the opening so that a repulsion force, which counteracts gravity on the first body, acts between the first magnet and the second magnet;
wherein a positive stiffness of the spring guide is at least partially compensated by a negative stiffness of a magnetic spring formed by the first magnet and the second magnet;
wherein the first magnet and the second magnet are shaped such that a horizontal distance between the first magnet and the second magnet inside of the opening of the second magnet varies in the vertical direction;
wherein the spring guide is arranged in a clamp form, having a vertically oriented, closed rear side connected to the second body and two horizontally oriented flat sides, arranged as leaf springs, connected to the first body.

* * * * *